United States Patent
Wang et al.

(10) Patent No.: US 8,692,464 B2
(45) Date of Patent: Apr. 8, 2014

(54) LIGHT GUIDING PLATE, BACKLIGHT MODULE AND DISPLAY DEVICE

(75) Inventors: Chiung-Han Wang, Kaohsiung County (TW); Shau-Yu Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 162 days.

(21) Appl. No.: 13/449,320

(22) Filed: Apr. 18, 2012

(65) Prior Publication Data
US 2013/0128609 A1    May 23, 2013

(30) Foreign Application Priority Data
Nov. 17, 2011 (TW) .............................. 100142010 A (51) Int. Cl.
*F21V 13/02* (2006.01)

(52) U.S. Cl.
USPC ........... 313/606; 362/620; 362/619; 362/330; 362/339

(58) Field of Classification Search
USPC ................. 362/606–608, 619–620, 330, 339; 359/599, 831
See application file for complete search history.

(56) References Cited

U.S. PATENT DOCUMENTS

| | | | |
|---|---|---|---|
| 7,892,638 B2 | 2/2011 | Jones et al. | |
| 7,936,411 B2 | 5/2011 | Kim et al. | |
| 2007/0008738 A1* | 1/2007 | Han et al. | 362/607 |
| 2007/0279934 A1* | 12/2007 | Kim et al. | 362/607 |
| 2010/0046103 A1* | 2/2010 | Yeh et al. | 359/831 |
| 2010/0128495 A1* | 5/2010 | Wang et al. | 362/620 |

FOREIGN PATENT DOCUMENTS

| | | |
|---|---|---|
| JP | 05-313004 | 11/1993 |
| JP | 10-214035 | 8/1998 |
| JP | 2001-345006 | 12/2001 |
| JP | 2004-192909 | 7/2004 |
| TW | I235249 | 7/2005 |
| TW | I312729 | 8/2009 |
| TW | M370050 | 12/2009 |
| TW | 201001005 | 1/2010 |
| TW | 201040626 | 11/2010 |
| TW | 201109787 | 3/2011 |
| TW | I340259 | 4/2011 |

* cited by examiner

*Primary Examiner* — Anh Mai
*Assistant Examiner* — Elmito Breval
(74) *Attorney, Agent, or Firm* — Jianq Chyun IP Office (57) ABSTRACT

A light guiding plate and a backlight module and a display device applying the light guiding plate are provided, in which a structure of prisms on a light emergence surface of the light guiding plate is designed by, for example, adopting a mixed structure of prisms in different specifications, regulating the specifications of the prisms, such as a vertex angle and a corresponding reprint ratio, varying the reprint ratio of the prisms with respect to a distance from a light incident surface of the light guiding plate, or combining the aforementioned design solutions, thereby adjusting a light emitting effect of the light guiding plate, increasing uniformity of backlight, and improving display quality of the display device.

21 Claims, 6 Drawing Sheets

LIGHT GUIDING PLATE, BACKLIGHT MODULE AND DISPLAY DEVICE

CROSS-REFERENCE TO RELATED APPLICATION

This application claims the priority benefit of Taiwan application serial no. 100142010, filed on Nov. 17, 2011. The entirety of the above-mentioned patent application is hereby incorporated by reference herein and made a part of this specification.

BACKGROUND

1. Technical Field

The present disclosure generally relates to a light guiding plate and a backlight module and a display device applying the light guiding plate, in particular, to a light guiding plate suitable for side type light incidence and a backlight module and a display device applying the light guiding plate.

2. Description of Related Art

With development of flat panel display technology, a liquid crystal display (LCD) increasingly becomes a main stream of the display technology, which replaces a conventional cathode ray tube (CRT) and is widely used in daily life. Since a liquid crystal panel in the LCD cannot emit light, a backlight module is required to provide a backlight source. According to a placement position of a light emitting device, the backlight module may be divided into a direct type backlight module and a side type backlight module, in which a light guiding plate of the side type backlight module may guide a light ray from a side surface to a front side to form a surface light source.

In the side type backlight module, a light emitting device, for example, a cold cathode fluorescent lamp (CCFL), is disposed on a light incident surface on a side edge of the light guiding plate. After passing through the light incident surface and entering the light guiding plate, a light ray from the CCFL is converted to the surface light source by the light guiding plate, and output from the light guiding plate via an upper surface thereof. In addition, a lower surface of the conventional light guiding plate is usually provided with a plurality of prisms or spot patterns, for destroying total reflection of the light ray in the light guiding plate, and converting the light ray to the surface light source. The upper surface of the light guiding plate is also provided with a plurality of prisms with the same height (that is, each prism is the same), so as to enhance light output of the light guiding plate.

With the breakthrough of the manufacturing process technology, a light emitting diode (LED) increasingly replaces the CCFL to be used as the light emitting device in the backlight module. In the known design, a plurality of LEDs is arranged besides the light incident surface of the light guiding plate with intervals. However, as a point light source, the light intensity of the plurality of LEDs on the light incident surface is not uniformly distributed, in which bright regions are formed on positions corresponding to the LEDs, and a dark region is formed between two LEDs, so that the surface light source output by the light guiding plate may generate mura along an extending direction of the prisms of the upper surface. In other words, conventionally, during practical application, the side type backlight module adopting the LED as the light emitting device may have a problem of non-uniform light emergence, thereby relatively lowering display quality of the LCD.

SUMMARY

Accordingly, the present disclosure provides a light guiding plate, in which a structure of prisms on a light emergence surface of the light guiding plate is designed, so as to increase light emergence uniformity of the light guiding plate.

The light guiding plate of the present disclosure includes a light transmissive substrate, a plurality of optical structures, a plurality of first prisms, and a plurality of second prisms. The light transmissive substrate has a first surface and a second surface opposite to the first surface. The optical structures are configured on the first surface. The first prisms and the second prisms are configured on the second surface, and the first prisms and the second prisms are substantially parallel and are alternatively arranged. Each first prism has a first top portion and two first inclined surfaces respectively connected to two sides of the first top portion, the first top portion has a first vertex, an included angle of the two first inclined surfaces is $\theta 1$. A first intersected point formed by extending the two first inclined surfaces of each first prism has a height H1 relative to the second surface, a height of the first vertex of each first top portion relative to the second surface is h1. Each first prism has a first reprint ratio R1, R1=h1/H1, and each first prism satisfies following conditions.

When $\theta 1 \leq 95°$, $R1 \leq 0.7$.
When $95° < \theta 1 \leq 105°$, $R1 \leq 0.8$.
When $105° < \theta 1 \leq 115°$, $R1 \leq 0.9$.
When $115° \leq \theta 1$, $R1 \leq 1$.

In an embodiment of the present invention, each second prism has a second top portion and two second inclined surfaces respectively connected to two sides of the second top portion. An included angle of the two second inclined surfaces is $\theta 2$.

In an embodiment of the present invention, $\theta 1$ of each first prism is constant, $\theta 2$ of each second prism is constant, and $\theta 1$ is smaller than or equal to $\theta 2$.

In an embodiment of the present invention, a second intersected point formed by extending the two second inclined surfaces has a height H2 relative to the second surface, each second top portion has a second vertex, a height of each second vertex relative to the second surface is h2, and each second prism has a second reprint ratio R2, R2=h2/H2. Each first prism satisfies following conditions.

When $\theta 1 \leq 95°$, $R1 < 0.6$.
When $95° < \theta 1 \leq 105°$, $R1 < 0.7$.
When $105° < \theta 1 \leq 115°$, $R1 < 0.8$.
When $115° < \theta 1 \leq 125°$, $R1 < 0.95$.
When $125° < \theta 1$, $R1 \leq 1$.

Each second prism satisfies following conditions.
When $\theta 2 \leq 95°$, $R2 < 0.6$.
When $95° < \theta 2 \leq 105°$, $R2 < 0.7$.
When $105° < \theta 2 \leq 115°$, $R2 < 0.8$.
When $115° < \theta 2 \leq 125°$, $R2 < 0.95$.
When $125° < \theta 2$, $R2 \leq 1$.

In an embodiment of the present invention, each first prism and each second prism have the same specification.

In an embodiment of the present invention, each first prism has an R1 value being $R1_{P1}$ on a first position of the second surface, each first prism has an R1 value being $R1_{P2}$ on a second position of the second surface. A distance between the first position and a light incident surface is smaller than a distance between the second position and the light incident surface, and $R1_{P1} < R1_{P2}$.

In an embodiment of the present invention, each second prism has a second top portion and two second inclined surfaces respectively connected to two sides of the second top portion. The second top portion has a second vertex, a second intersected point formed by extending the two second inclined surfaces has a height H2 relative to the second surface. A height of each second vertex relative to the second surface is h2, and each second prism has a second reprint ratio R2, R2=h2/H2. Each second prism has an R2 value being R2$_{P3}$ on a third position of the second surface, and each second prism has an R2 value being R2$_{P4}$ on a fourth position of the second surface. A distance between the third position and the light incident surface is smaller than a distance between the fourth position and the light incident surface, and R2$_{P3}$<R2$_{P4}$.

In an embodiment of the present invention, the same first prism respectively has θ1 values being θ1$_{P5}$ and θ1$_{P6}$ on a fifth position and a sixth position of the second surface. A distance between the fifth position and the light incident surface is smaller than a distance between the sixth position and the light incident surface. The same second prism respectively has θ2 values being θ2$_{P7}$ and θ2$_{P8}$ on a seventh position and an eighth position of the second surface. A distance between the fifth position and the light incident surface is equal to a distance between the seventh position and the light incident surface, a distance between the sixth position and the light incident surface is equal to a distance between the eighth position and the light incident surface, θ1$_{P5}$<θ2$_{P7}$, and θ1$_{P6}$=θ2$_{P8}$.

In an embodiment of the present invention, the optical structures include a plurality of spot patterns or a plurality of third prisms arranged side-by-side.

The present disclosure also provides a backlight module applying the light guiding plate, capable of providing a uniform surface light source. The backlight module includes the light guiding plate and a light emitting device. The light emitting device is disposed besides the light incident surface of the light guiding plate.

In an embodiment of the present invention, the light emitting device includes a plurality of LED units, and an arrangement direction of the LED units is substantially vertical to an extending direction of the first prisms and the second prisms.

The present disclosure further provides a display device applying the light guiding plate and the backlight module, capable of achieving good display quality through the uniform surface light source provided by the backlight module. The display device includes the light guiding plate, the light emitting device, and a display panel. The light emitting device is disposed besides the light incident surface of the light guiding plate, and the display panel is configured above the second surface of the light guiding plate.

In order to make the aforementioned features and advantages of the disclosure comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
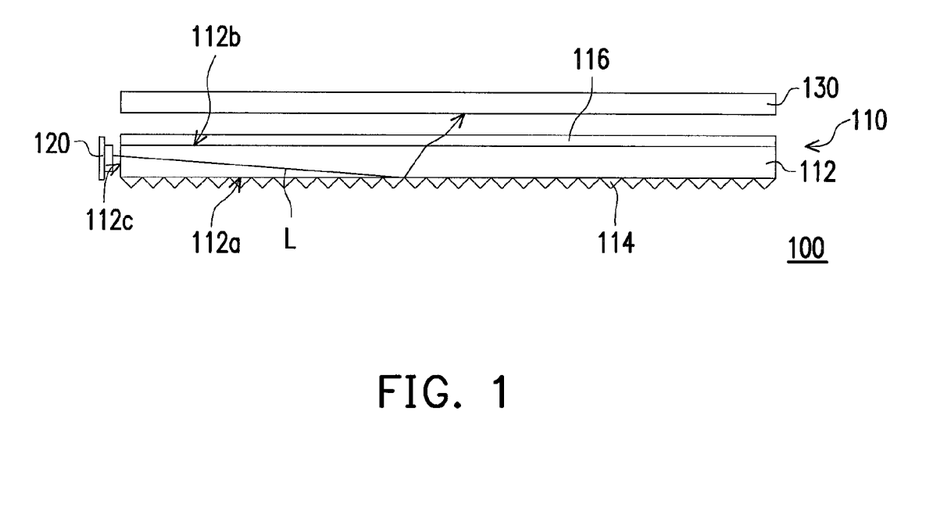
FIG. 1 is a schematic view of a display device according to the present invention.

FIG. 1 is a schematic view of a display device according to the present disclosure. As shown in FIG. 1, the display device 100 includes a light guiding plate 110, a light emitting device 120, and a display panel 130. The light guiding plate 110 is mainly formed by a light transmissive substrate 112. The light transmissive substrate 112 has a first surface 112a, a second surface 112b opposite to the first surface 112a, and a light incident surface 112c connected between the first surface 112a and the second surface 112b. The light emitting device 120 is, for example, an LED light bar, configured besides the light incident surface 112c of the light transmissive substrate 110, for emitting a light ray L, so that the light ray L enters the light transmissive substrate 112 from the light incident surface 112c. The display panel 130 is, for example, a liquid crystal display panel, configured above the second surface 112b of the light transmissive substrate 112.

In addition, the first surface 112a of the light transmissive substrate 112 is used as a light diffusing surface and a light reflecting surface, and has a plurality of optical structures 114 formed thereon, for example, prisms arranged side-by-side as shown in FIG. 1 or spot patterns not shown. The second surface 112b of the light transmissive substrate 112 is used as a light emergence surface, and has a plurality of prisms 116 formed thereon, for enhancing light output of the light guiding plate 110. After being diffused and reflected by the optical structures 114 on the first surface 112a, the light ray L incident to the light transmissive substrate 112 may be emergent from the light transmissive substrate through the prisms 116 on the second surface 112b. The display panel 130 receives the light ray L emergent from the second surface 112b of the light transmissive substrate 110, for using the light ray L as a display light source.

In the present disclosure, a structure of the prisms 116 on the second surface 112b may be designed, thereby adjusting a light emitting effect of the light guiding plate 110, increasing uniformity of backlight, and improving display quality of the display device.

The provided design solution includes: adopting a mixed structure of prisms in different specifications (for example, alternately arranging strip prism structures in different specifications, or providing a strip prism having various specifications thereon); regulating the specifications of the prisms 116, such as a vertex angle and a corresponding reprint ratio; varying the reprint ratio of the prisms 116 with respect to a distance from a light incident surface 112c; or combining the aforementioned design solutions. In the following, a plurality of embodiments is listed to describe the aforementioned design solutions. Definitely, after referring to the embodiments, those of ordinary skill in the art of the present disclosure adjust or combine the plurality of design solutions according to practical states in a reasonable scope, so as to satisfy application demands.

Generally, the light guiding plate is formed in a molding process, so as to transfer a structure pattern (for example, a prism pattern) on a mold to the light transmissive substrate. However, the structure pattern on the mold may be different from the structure practically formed on the light transmissive substrate, with regard to the reprint ratio in the manufacturing process.

Figure 2:
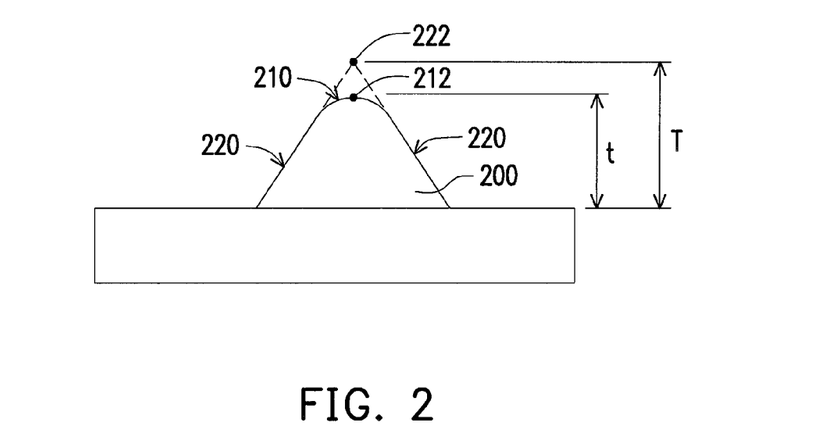
FIG. 2 describes a definition of a reprint ratio of a structure of a prism according to the present invention.

FIG. 2 describes a definition of a reprint ratio of a structure of a prism according to the present disclosure. As shown in FIG. 2, because of manufacturing factors, the prism 200 may be reduced from an original designed height T to a practical height t. More specifically, the practically formed prism 200 has an arc top portion 210 and two inclined surfaces 220 respectively connected to two sides of the top portion 210. An intersected point 222 formed by extending the two inclined surfaces 220 has a desired height T, and a vertex 212 of the top portion 210 has a practical height t. Here, the reprint ratio R is defined as a ratio of the practical height t to the desired height T, that is, R=t/T. However, when the prism 200 is a strip prism structure, the intersected point 222 formed by extending the two inclined surfaces 220 may form a line shape, but for ease of description, in this embodiment, a cross-section structure of the prism 200 is used for description.

In addition, a light intensity of the light ray passing through the structure of the prism is relevant to the reprint ratio of the structure of the prism, in which the lower the reprint ratio of the structure of the prism is, the lower the light intensity of the output light ray is. Based on the characteristic, the design regulations described in the plurality of embodiments in the following are provided for the structure of the prism on the light guiding plate.

Figure 3:
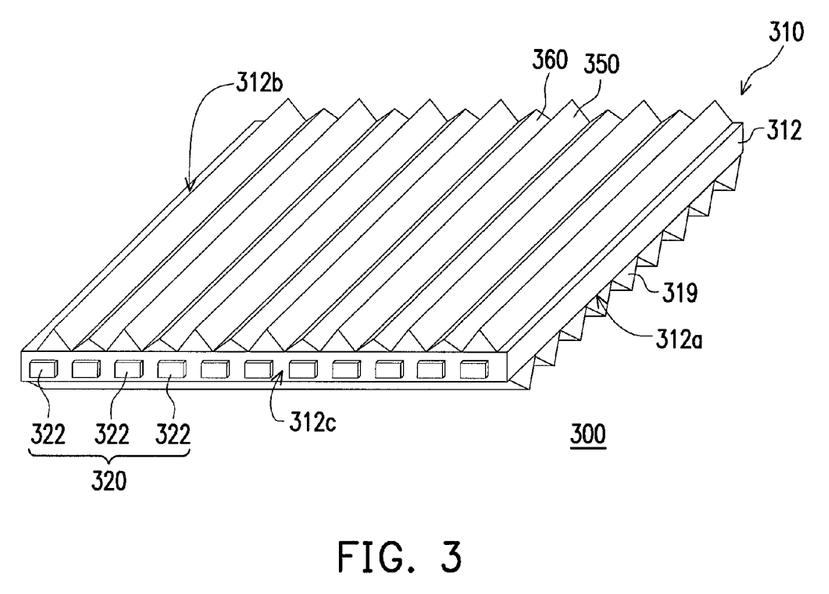
FIG. 3 shows a backlight module according to an embodiment of the present invention.

FIG. 3 shows a backlight module 300 according to an embodiment of the present invention, which includes a light guiding plate 310 and a light emitting device 320. The light guiding plate 310 is mainly formed by a light transmissive substrate 312. The light emitting device 320 includes a plurality of LED units 322, disposed besides a light incident surface 312c of the light transmissive substrate 312. An arrangement direction of the LED unit 322 is substantially parallel to the light incident surface 312c, that is, the LED units 322 are arranged along the light incident surface 312c.

In this embodiment, a first surface 312a of the light transmissive substrate 312 is disposed with a plurality of prisms 319, spot patterns (not shown), or other optical structures. In this embodiment, a plurality of first prisms 350 of the first surface 312a and a second surface 312b with vertical extending directions is used for description, but the present invention is not limited thereto. For example, the extending directions of the structures of the prisms of the first surface 312a and the second surface 312b have an included angle or be parallel, or the prisms 319 located on the first surface 312a may adopt a mixed structure of prisms in different specifications. The second surface 312b of the light transmissive substrate 312 is disposed with a plurality of first prisms 350 and a plurality of second prisms 360. The plurality of first prisms 350 and the plurality of second prisms 360 are substantially parallel, and are alternately arranged, and an extending direction of each first prism 350 and each second prism 360 is substantially vertical to the arrangement direction of the LED units 322, that is, the arrangement direction of the LED units 322 and the extending direction of the first prism 350 and the second prism 360 have an included angle, so that the light incident surface 312c of the light guiding plate 310 and the extending direction of the first prism 350 and the second prism 360 have an included angle.

Figure 4:
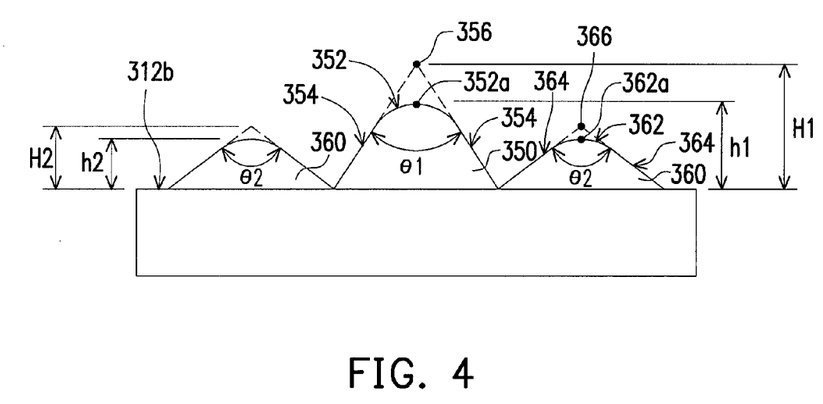
FIG. 4 is a partial front view of first prisms and second prisms.

FIG. 4 is a partial front view of the first prisms 350 and the second prisms 360 of FIG. 3. Each first prism 350 has a first top portion 352 and two first inclined surfaces 354 respectively connected to two sides of the first top portion 352, in which the first top portion 352 has a first vertex 352a, and an included angle of the two first inclined surfaces 354 is θ1, which is called the vertex angle of the first prism 350. A first intersected point 356 formed by extending the two first inclined surfaces 354 of each first prism 350 has a height H1 relative to the second surface 312b, that is, a desired height is H1, and a height of the first vertex 352a relative to the second surface 312b is h1, that is, a practical height is h1. In this manner, a first reprint ratio R1 of the first prism 350 is defined as R1=h1/H1, and each first prism 350 may satisfy the following condition I:

When θ1≤95°, R1≤0.7;
When 95°<θ1≤R1≤0.8;
When 105°<θ1≤115°, R1≤0.9; and
When 115°≤θ1, R1≤1.

In addition, each second prism 360 has a second top portion 362 and two second inclined surfaces 364 respectively connected to two sides of the second top portion 362, in which the second top portion 362 has a second vertex 362a, and an included angle of the two second inclined surfaces 364 is θ2, which is called a vertex angle of the second prism 360 in the following. A second intersected point 366 formed by extending the two second inclined surfaces 364 of each second prism 360 has a height H2 relative to the second surface 312b, that is, a desired height is H2, and a height of the second vertex 362a relative to the second surface 312b is h2, that is, a practical height is h2. In this manner, the second reprint ratio R2 of the second prism 360 is defined as R2=h2/H2.

This embodiment regulates the first reprint ratio R1 of the first prism 350 rather than the second reprint ratio R2 of the second prism 360. If possible, the vertex angle θ1 of the first prism 350 and the vertex angle θ2 of the second prism 360 are respectively constant, and θ1 is smaller than θ2. In other words, the first prism 350 and the second prism 360 of this embodiment have different specifications, and the first reprint ratio R1 and the vertex angle θ1 of the first prism 350 are regulated, so as to effectively improve the uniformity of the backlight output by the light guiding plate 310. Therefore, in this embodiment, the light guiding plate 310 has two structures of the prisms being alternately arranged and with different vertex angles, that is, the first prism 350 and the second prism 360 have different vertex angles. When the vertex angle of the first prism 350 is smaller than the vertex angle of the second prism 360, and the specification is satisfied, the uniform backlight effect may be obtained.

Figure 5:
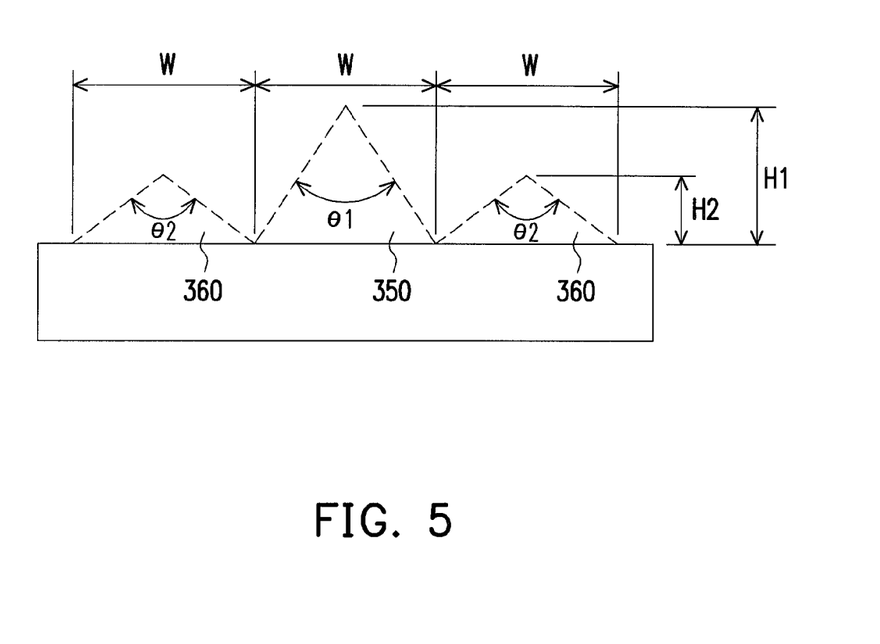
FIG. 5 and FIG. 6 respectively show a structure of prisms with different heights and a structure of prisms with different widths.
Figure 6:
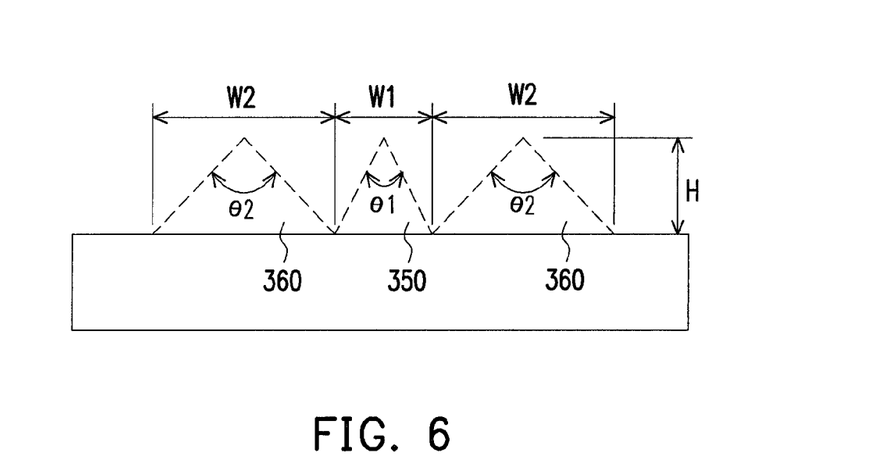

Practically, the vertex angle θ1 of the first prism 350 and the vertex angle θ2 of the second prism 360 are relevant to the heights and the widths of the first prism 350 and the second prism 360. FIG. 5 and FIG. 6 respectively show a structure of prisms with different heights and adopting the aforementioned regulation and a structure of prisms with different widths and adopting the aforementioned regulation. Firstly, as shown in FIG. 5, the height H1 of the first prism 350 is greater than the height H2 of the second prism 360, and the first prism 350 and the second prism 360 have the same width W, so that the vertex angle θ1 of the first prism 350 is smaller than the vertex angle θ2 of the second prism 360. In addition, as shown in FIG. 6, the first prism 350 and the second prism 360 have the same height H, and the width W1 of the first prism 350 is smaller than the width W2 of the second prism 360, so that the vertex angle θ1 of the first prism 350 is smaller than the vertex angle θ2 of the second prism 360. In other words, in this embodiment, the vertex angle of the prism may be controlled by adjusting the height and the width of the prism. For ease of description, the drawing of this embodiment only shows the prism with the vertex angle being a closed angle, but the prism with an arc vertex angle may be formed because of the different reprint ratios. Generally, the vertex angle may affect the light emergence intensity of the light guiding plate, wherein the smaller the vertex angle is, the stronger the light emergence intensity is. In addition, the reprint ratio of the prism may affect the display quality. Therefore, the optical quality and the intensity are controlled through the vertex angle and the optical quality.

In another embodiment of the present invention, the reprint ratios of the first prism and the second prism may be regulated at the same time. For example, for the first prisms 350 and the second prisms 360 as shown in FIG. 3 and FIG. 4, each first prism 350 satisfies the following condition II.

When θ1≤95°, R1<0.6;
When 95°<θ1≤105°, R1<0.7;
When 105°<θ1≤115°, R1<0.8;
When 115°<θ1≤125°, R1<0.95; and
When 125°<θ1, R1≤1.

In addition, each second prism 360 satisfies the following condition III.

When θ2≤95°, R2<0.6;
When 95°<θ2≤105°, R2<0.7;
When 105°<θ2≤115°, R2<0.8;
When 115°<θ2≤125°, R2<0.95; and
When 125°<θ2, R2≤1.

Therefore, in this embodiment, the light guiding plate 310 has two types of structures of the prisms including the first prism 350 and the second prism 360, which are alternately arranged. When the first prism 350 and the second prism 360 respectively satisfy the specifications, the uniform backlight effect may be obtained. For example, the vertex angle θ1 of the first prism 350 is 80°, and the first reprint ratio R1 is 0.5; while the vertex angle θ2 of the second prism 360 is 80°, and the second reprint ratio R2 is 0.4. That is, the first prism 350 and the second prism 360 have the same vertex angle and different reprint ratios. Alternatively, the vertex angle θ1 of the first prism 350 is 80°, and the first reprint ratio R1 is 0.5; while the vertex angle θ2 of the second prism 360 is 100°, and the second reprint ratio R2 is 0.5. That is, the first prism 350 and the second prism have different vertex angles and the same reprint ratio. Alternatively, the vertex angle θ1 of the first prism 350 is 80°, and the first reprint ratio R1 is 0.5; while the vertex angle θ2 of the second prism 360 is 120°, and the second reprint ratio R2 is 0.8. That is, the first prism 350 and the second prism 360 have different vertex angles and different reprint ratios. In the aforementioned examples, the first prism 350 and the second prism 360 satisfy the specifications, so as to obtain the uniform backlight effect.

Figure 7:
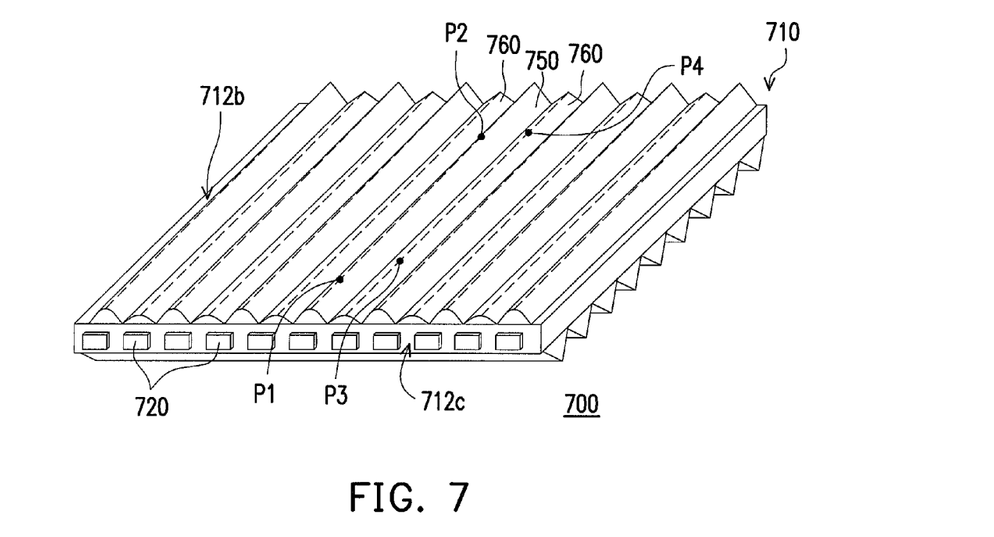
FIG. 7 shows a backlight module according to another embodiment of the present invention.

On the other hand, considering that after entering the light guiding plate, the light ray emitted by the light emitting device may be attenuated, in the embodiments of the present invention, the reprint ratio of the prism may be adjusted according to a distance between the prism and the light incident surface (or the light emitting device). FIG. 7 shows a backlight module 700 according to another embodiment of the present invention, which includes a light guiding plate 710 and a light emitting device 720. The structure of the backlight module 700 is similar to that of the backlight module 300 of FIG. 3, except that first prisms 750 and second prisms 760 of the backlight module 770 of this embodiment have varied reprint ratios on extending directions vertical to a light incident surface 712c. More specifically, each first prism 750 has an R1 value being $R1_{P1}$ on a first position P1 of a second surface 712b, and has an R1 value being $R1_{P2}$ on a second position P2 of the second surface 712b, in which a distance between the first position P1 and the light incident surface 712c is smaller than a distance between the second position P2 and the light incident surface 712c, and $R1_{P1}<R1_{P2}$. Further, each second prism 760 has an R2 value being $R2_{P3}$ on a third position P3 of the second surface 712b, and has an R2 value being $R2_{P4}$ on a fourth position P4 of the second surface 712b, in which a distance between the third position P3 and the light incident surface 712c is smaller than a distance between the fourth position P4 and the light incident surface 712c, and $R2_{P3}<R2_{P4}$.

Figure 8:
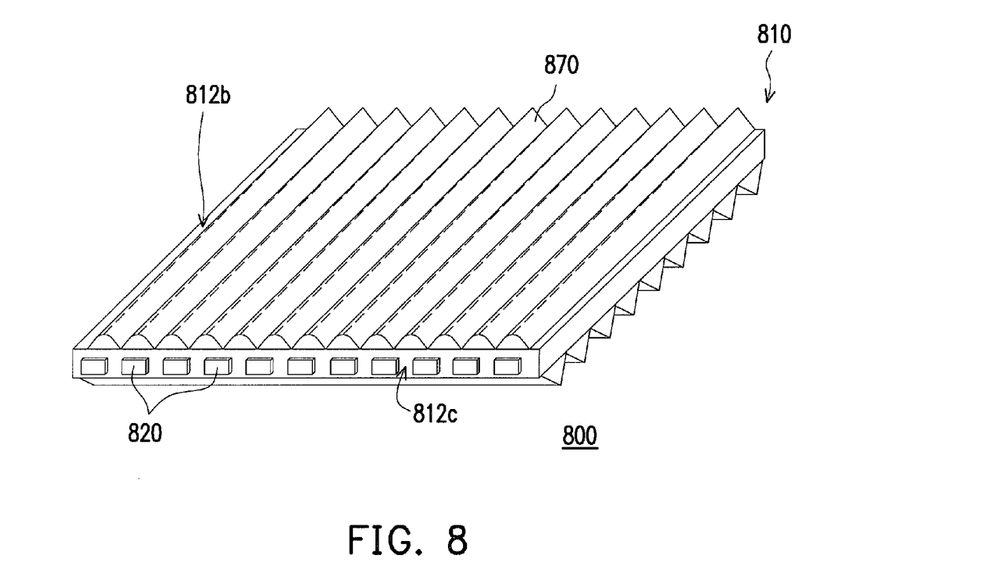
FIG. 8 shows a backlight module according to another embodiment of the present invention.

Although in the plurality of aforementioned embodiments, the mixed structure formed by the first prisms and the second prisms with the different specifications is used to describe the design solution of the present invention, practically, in the present invention, the structure of the prisms with the single specification may also be configured on a top surface of the light guiding plate. That is, the first prism and the second prism have the same specification. Further, the aforementioned regulated conditions I to III may be applied to the structure of the prisms with the single specification. In addition, the design in which the reprint ratio of the prism is varied with respect to the distance from the light incident surface as shown in FIG. 7 may be adopted. FIG. 8 shows a backlight module 800 according to another embodiment of the present invention, which includes a light guiding plate 810 and a light emitting device 820. The structure of the backlight module 800 is similar to that of the backlight module 700 of FIG. 7, except that prisms 870 on a second surface 812b of the backlight module 800 of this embodiment have the same specification. Similarly, each of the prisms 870 has varied reprint ratio on an extending direction, the closer the position is to a light incident surface 812c (or the light emitting device 820), the lower the reprint ratio is. In other embodiments not shown here, the reprint ratio of each prism 80 on the extending direction may also be constant, for example, each prism 870 has the same vertex angle and the same reprint ratio.

Figure 9:
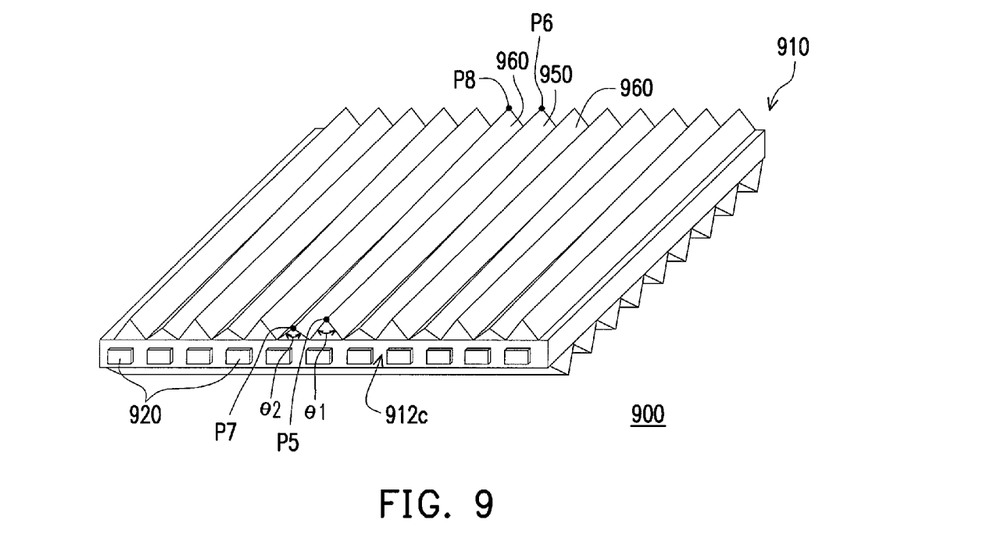
FIG. 9 shows a backlight module according to further another embodiment of the present invention.

FIG. 9 shows a backlight module 900 according to further another embodiment of the present invention, which includes a light guiding plate 910 and a light emitting device 920. The structure of the backlight module 900 is similar to the backlight module 300 of FIG. 3, except that first prisms 950 and second prisms 960 of the backlight module 900 of this embodiment have different specifications on a position close to a light incident surface 912c, thereby forming a mixed structure, for example, the first prisms 950 and the second prisms 960 have different vertex angles θ1 and θ2. In addition, the first prisms 950 and the second prisms 960 have the same specification on a position away from the light incident surface 912c, thereby forming a single prism structure. More specifically, the same first prism 950 respectively has θ1 values being $θ1_{P5}$ and $θ1_{P6}$ on a fifth position P5 and a sixth position P6 of the second surface 912c, and a distance between the fifth position P5 and the light incident surface 912c is smaller than a distance between the sixth position P6 and the light incident surface 912c. The same second prism 960 respectively has θ2 values being $θ2_{P7}$ and $θ2_{P8}$ on a seventh position P7 and an eighth position P8 on the second surface 912c. The fifth position P5 and the seventh position P7 are located on an edge of the light guiding plate 910 adjacent to the light incident surface 912c, and a distance between the fifth position P5 and the light incident surface 912c is equal to a distance between the seventh position P7 and the light incident surface 912c. The sixth position P6 and the eighth position P8 are located on an edge of the light guiding plate 910 away from the light incident surface 912c, and a distance between the sixth position P6 and the light incident surface 912c is equal to a distance between the eighth position P8 and the light incident surface 912c, $\theta1_{P5}<\theta2_{P7}$, and $\theta1_{P6}=\theta2_{P8}$.

Figure 10:
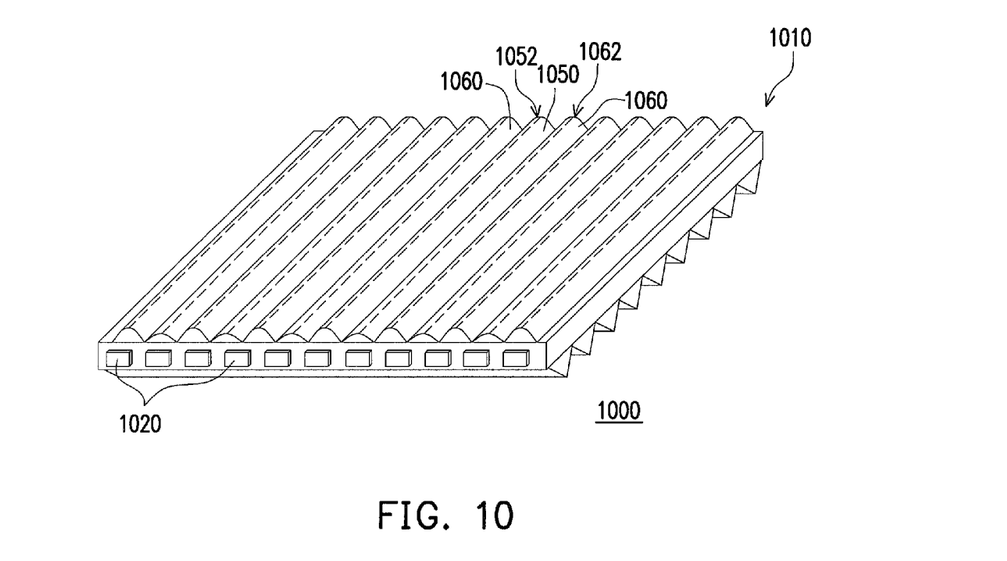
FIG. 10 shows a backlight module according to further still another embodiment of the present invention.

FIG. 10 shows a backlight module 1000 according to further still another embodiment of the present invention, which includes a light guiding plate 1010 and a light emitting device 1020. The structure of the backlight module 1000 is similar to the backlight module 900 of FIG. 9, except that reprint ratios of first prisms 1050 and second prisms 1060 of the backlight module 1000 of this embodiment are smaller than the reprint ratios of the first prisms 950 and the second prisms 960 of the above embodiment. That is to say, the first prism 1050 and the second prism 1060 respectively have a curved first top portion 1052 and a curved second top portion 1062.

Figure 11:
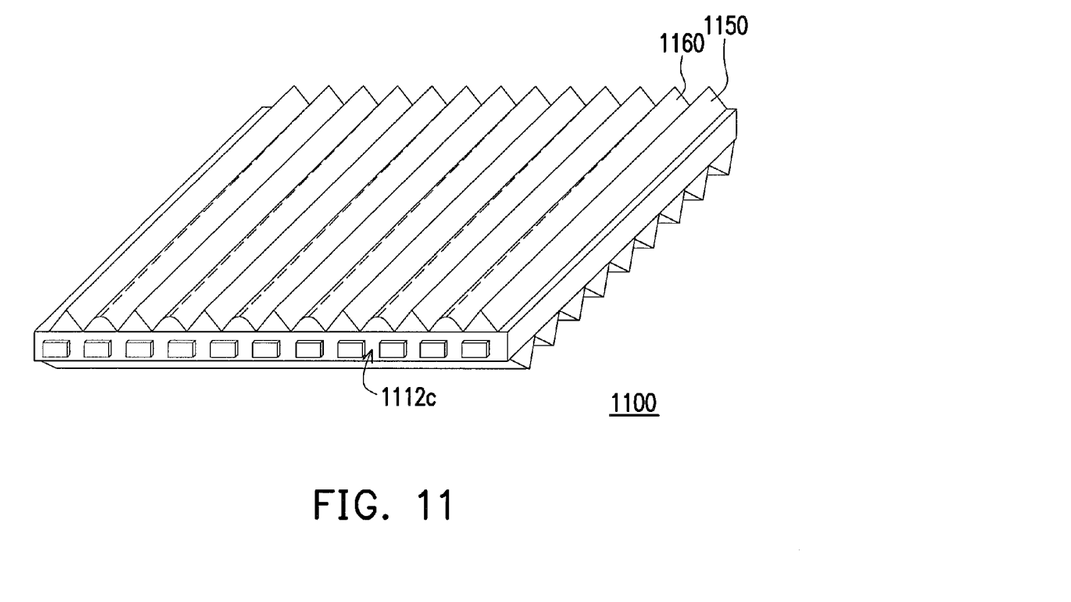
FIG. 11 shows a backlight module according to another embodiment of the present invention.

In other embodiments, the mixed structure of the prisms may be a structure of prisms with different reprint ratios. As shown in FIG. 11, first prisms 1150 and second prisms 1160 of this embodiment have the same vertex angle, and have the same reprint ratio on a position away from a light incident surface 1112c. In addition, the first prisms 1150 and the second prisms 1160 have different reprint ratios on a position close to the light incident surface 1112c.

In other words, the mixed structure adopted by the present invention may have mixed conditions on the specifications of the prisms, for example, a width of the prism, a vertex angle, a height, and a reprint ratio.

Figure 12:
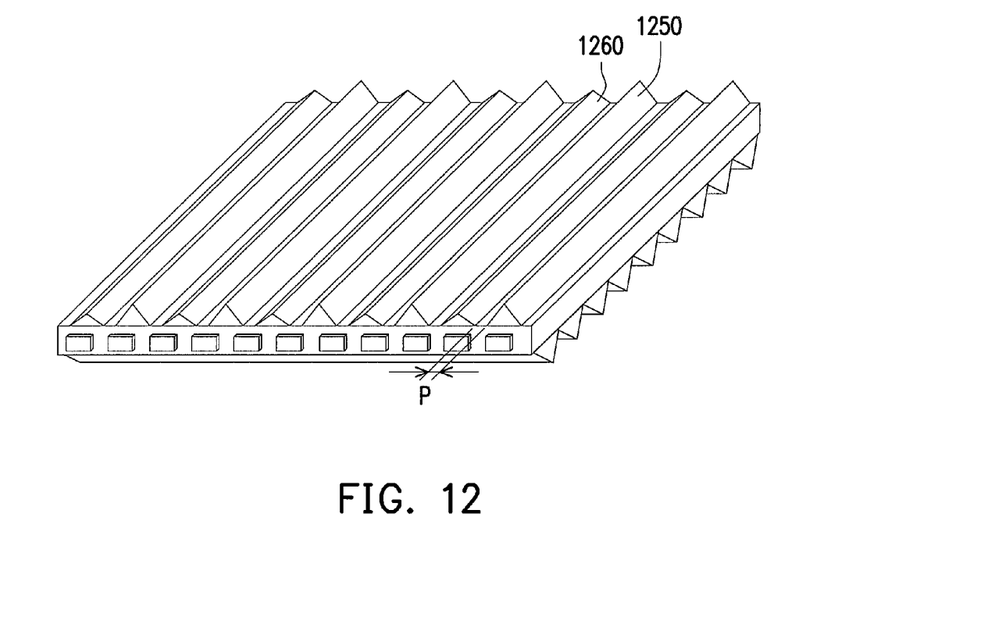
FIG. 12 shows a backlight module according to another embodiment of the present invention.

In the aforementioned embodiments and the drawings, the first prisms and the second prisms are closely arranged; that is, two bottom angles of the prism are connected to bottom angles of the adjacent prism. However, in another embodiment, the first prism and the second prism may be spaced from each other. FIG. 12 shows an alternative embodiment of the backlight module of FIG. 3. As shown in FIG. 12, bottom parts of the first prism 1250 and the second prism 1260 being adjacent do not contact with each other, and have a pitch P there between. Definitely, the pitch P may be designed according to different demands, and the pitch P may be equal or gradational, as the first prism 1250 and the second prism 1260 have the pitch, the display quality may be enhanced. Definitely, the structure of the prisms as shown in this embodiment may combine the design solutions of the plurality of aforementioned embodiments, for example, the varying of the vertex angle, the varying of the reprint ratio, and the mixed structure, so as to achieve the particular technical effect.

In addition, although the first prisms and the second prisms in the aforementioned embodiments are disposed at intervals, that is, one second prism is located between two adjacent first prisms, in other not shown embodiments of the present invention, the number of the first prisms and the second prisms disposed at intervals may be changed. That is, at least one of the first prism disposes between the two adjacent second prisms or at least one of the second prism disposes between the two adjacent first prisms. For example, the first prisms and the second prisms are disposed at intervals in a two-two manner, or taking more than two first prisms or second prisms as a unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guiding plate, comprising:
a light transmissive substrate, comprising a first surface and a second surface opposite to the first surface;
a plurality of optical structures, configured on the first surface;
a plurality of first prisms, configured on the second surface, wherein the first prisms are substantially parallel, and each first prism comprises a first top portion and two first inclined surfaces respectively connected to two sides of the first top portion, the first top portion comprises a first vertex, an included angle of the two first inclined surfaces is $\theta1$, a first intersected point formed by extending the two first inclined surfaces has a height H1 relative to the second surface, a height of the first vertex relative to the second surface is h1, and each first prism comprises a first reprint ratio R1, R1=h1/H1, wherein each first prism satisfies following conditions:
when $\theta1 \leq 95°$, $R1 \leq 0.7$;
when $95° < \theta1 \leq 105°$, $R1 \leq 0.8$;
when $105° < \theta1 \leq 115°$, $R1 \leq 0.9$; and
when $115° \leq \theta1$, $R1 \leq 1$; and
a plurality of second prisms, configured on the second surface, wherein the first prisms and the second prisms are substantially parallel, and the first prisms and the second prisms are alternately arranged.

2. The light guiding plate according to claim 1, wherein each second prism comprises a second top portion and two second inclined surfaces respectively connected to two sides of the second top portion, and an included angle of the two second inclined surfaces is $\theta2$.

3. The light guiding plate according to claim 2, wherein $\theta1$ of each first prism is constant, $\theta2$ of each second prism is constant, and $\theta1$ is smaller than $\theta2$.

4. The light guiding plate according to claim 2, wherein a second intersected point formed by extending the two second inclined surfaces has a height H2 relative to the second surface, each second top portion comprises a second vertex, a height of each second vertex relative to the second surface is h2, each second prism comprises a second reprint ratio R2, R2=h2/H2, and each first prism satisfies following conditions:
when $\theta1 \leq 95°$, $R1 < 0.6$;
when $95° < \theta1 \leq 105°$, $R1 < 0.7$;
when $105° < \theta1 \leq 115°$, $R1 < 0.8$;
when $115° < \theta1 \leq 125°$, $R1 < 0.95$; and
when $125° < \theta1$, $R1 \leq 1$;
and each second prism satisfies following conditions:
when $\theta2 \leq 95°$, $R2 < 0.6$;
when $95° < \theta2 \leq 105°$, $R2 < 0.7$;
when $105° < \theta2 \leq 115°$, $R2 < 0.8$;
when $115° < \theta2 \leq 125°$, $R2 < 0.95$; and
when $125° < \theta2$, $R2 \leq 1$.

5. The light guiding plate according to claim 2, wherein each first prism and each second prism have the same specification.

6. The light guiding plate according to claim 2, wherein the first prism respectively comprises $\theta1$ values being $\theta1_{P5}$ and $\theta1_{P6}$ on a fifth position and a sixth position of the second surface, a distance between the fifth position and a light incident surface is smaller than a distance between the sixth position and the light incident surface, the same second prism respectively comprises $\theta2$ values being $\theta2_{P7}$ and $\theta2_{P8}$ on a seventh position and an eighth position of the second surface, a distance between the fifth position and the light incident surface is equal to a distance between the seventh position and the light incident surface, a distance between the sixth position and the light incident surface is equal to a distance between the eighth position and the light incident surface, $\theta 1_{P5} < \theta 2_{P7}$, and $\theta 1_{P6} = \theta 2_{P8}$.

7. The light guiding plate according to claim 1, wherein each first prism comprises an R1 value being $R1_{P1}$ on a first position of the second surface, each first prism comprises an R1 value being $R1_{P2}$ on a second position of the second surface, a distance between the first position and a light incident surface is smaller than a distance between the second position and the light incident surface, and $R1_{P1} < R_{P2}$.

8. The light guiding plate according to claim 1, wherein each second prism comprises a second top portion and two second inclined surfaces respectively connected to two sides of the second top portion, the second top portion comprises a second vertex, a second intersected point formed by extending the two second inclined surfaces has a height H2 relative to the second surface, a height of each second vertex relative to the second surface is h2, each second prism comprises a second reprint ratio R2, R2=h2/H2, wherein each second prism comprises an R2 value being $R2_{P3}$ on a third position of the second surface, each second prism comprises an R2 value being $R2_{P4}$ on a fourth position of the second surface, a distance between the third position and a light incident surface is smaller than a distance between the fourth position and the light incident surface, and $R2_{P3} < R2_{P4}$.

9. The light guiding plate according to claim 1, wherein the optical structures comprise a plurality of spot patterns or a plurality of third prisms arranged side-by-side.

10. The light guiding plate according to claim 1, wherein each first prism is spaced from an adjacent second prism.

11. The light guide plate according to claim 1, wherein the bottom parts of the first prism and the second prism being adjacent has a pitch P there between.

12. The light guide plate according to claim 1, wherein at least one of the first prism disposes between the two adjacent second prisms.

13. The light guide plate according to claim 1, wherein at least one of the second prism disposes between the two adjacent first prisms.

14. A backlight module, comprising:
a light guiding plate, comprising:
   a light transmissive substrate, comprising a first surface and a second surface opposite to the first surface;
   a plurality of optical structures, configured on the first surface;
   a plurality of first prisms, configured on the second surface, wherein the first prisms are substantially parallel, and each first prism comprises a first top portion and two first inclined surfaces respectively connected to two sides of the first top portion, the first top portion comprises a first vertex, an included angle of the two first inclined surfaces is $\theta 1$, a first intersected point formed by extending the two first inclined surfaces has a height H1 relative to the second surface, a height of the first vertex relative to the second surface is h1, and each first prism comprises a first reprint ratio R1, R1=h1/H1, wherein each first prism satisfies following conditions:
   when $\theta 1 \leq 95°$, $R1 \leq 0.7$;
   when $95° < \theta 1 \leq 105°$, $R1 \leq 0.8$;
   when $105° < \theta 1 \leq 115°$, $R1 \leq 0.9$; and
   when $115° \leq \theta 1$, $R1 \leq 1$; and
   a plurality of second prisms, configured on the second surface, wherein the first prisms and the second prisms are substantially parallel, and the first prisms and the second prisms are alternately arranged; and
a light emitting device, arranged and disposed along the light incident surface, and an arrangement direction of the light emitting device and an extending direction of the first prisms have an included angle.

15. The backlight module according to claim 14, wherein each second prism comprises a second top portion and two second inclined surfaces respectively connected to two sides of the second top portion, and an included angle of the two second inclined surfaces is $\theta 2$.

16. The backlight module according to claim 15, wherein $\theta 1$ of each first prism is constant, $\theta 2$ of each second prism is constant, and $\theta 1$ is smaller than $\theta 2$.

17. The backlight module according to claim 15, wherein a second intersected point formed by extending the two second inclined surfaces has a height H2 relative to the second surface, each second top portion comprises a second vertex, a height of each second vertex relative to the second surface is h2, each second prism comprises a second reprint ratio R2, R2=h2/H2, and each first prism satisfies following conditions:
when $\theta 1 \leq 95°$, $R1 < 0.6$;
when $95° < \theta 1 \leq 105°$, $R1 < 0.7$;
when $105° < \theta 1 \leq 115°$, $R1 < 0.8$;
when $115° < \theta 1 \leq 125°$, $R1 < 0.95$; and
when $125° < \theta 1$, $R1 \leq 1$;
and each second prism satisfies following conditions:
when $\theta 2 \leq 95°$, $R2 < 0.6$;
when $95° < \theta 2 \leq 105°$, $R2 < 0.7$;
when $105° < \theta 2 \leq 115°$, $R2 < 0.8$;
when $115° < \theta 2 \leq 125°$, $R2 < 0.95$; and
when $125° < \theta 2$, $R2 \leq 1$.

18. The backlight module according to claim 15, wherein each first prism and each second prism have the same specification.

19. The backlight module according to claim 15, wherein the first prism respectively comprises $\theta 1$ values being $\theta 1_{P5}$ and $\theta 1_{P6}$ on a fifth position and a sixth position of the second surface, a distance between the fifth position and a light incident surface is smaller than a distance between the sixth position and the light incident surface, the same second prism respectively comprises $\theta 2$ values being $\theta 2_{P7}$ and $\theta 2_{P8}$ on a seventh position and an eighth position of the second surface, a distance between the fifth position and the light incident surface is equal to a distance between the seventh position and the light incident surface, a distance between the sixth position and the light incident surface is equal to a distance between the eighth position and the light incident surface, $\theta 1_{P5} < \theta 2_{P7}$, and $\theta 1_{P6} = \theta 2_{P8}$.

20. The backlight module according to claim 14, wherein each first prism comprises an R1 value being $R1_{P1}$ on a first position of the second surface, each first prism comprises an R1 value being $R1_{P2}$ on a second position of the second surface, a distance between the first position and a light incident surface is smaller than a distance between the second position and the light incident surface, and $R1_{P1} < R1_{P2}$.

21. The backlight module according to claim 14, wherein each second prism comprises a second top portion and two second inclined surfaces respectively connected to two sides of the second top portion, the second top portion comprises a second vertex, a second intersected point formed by extending the two second inclined surfaces has a height H2 relative to the second surface, a height of each second vertex relative to the second surface is h2, each second prism comprises a second reprint ratio R2, R2=h2/H2, wherein each second prism comprises an R2 value being $R2_{P3}$ on a third position of the second surface, each second prism comprises an R2 value being $R2_{P4}$ on a fourth position of the second surface, a distance between the third position and a light incident surface is smaller than a distance between the fourth position and the light incident surface, and $R2_{P3} < R2_{P4}$.

* * * * *